United States Patent
Nelson

[11] Patent Number: 6,031,682
[45] Date of Patent: Feb. 29, 2000

[54] TRACK TRIMMING AND ORTHOGONAL RECORDING FOR CARTRIDGE TAPE

[75] Inventor: Gary T. Nelson, Carlsbad, Calif.

[73] Assignee: Iomega Corporation, Roy, Utah

[21] Appl. No.: 08/892,151

[22] Filed: Jul. 14, 1997

[51] Int. Cl.[7] ............................................... G11B 5/584
[52] U.S. Cl. .............................. 360/77.12; 360/77.07; 360/76
[58] Field of Search .......................... 360/77.12, 77.13, 360/77.14, 77.15, 77.16, 77.01, 76, 77.07

[56] References Cited

U.S. PATENT DOCUMENTS

| | | |
|---|---|---|
| 32,205 | 8/1861 | Robinson . |
| Re. 32,205 | 7/1986 | Bar ........................................ 360/77.13 |
| 3,526,371 | 9/1970 | Blackie et al. ........................... 242/192 |
| 3,924,823 | 12/1975 | Cohen et al. ............................. 242/198 |
| 4,120,010 | 10/1978 | Mitsuya et al. .......................... 360/103 |
| 4,285,019 | 8/1981 | Scott et al. .............................. 360/103 |
| 4,498,129 | 2/1985 | Velazquez ............................... 364/174 |
| 4,586,094 | 4/1986 | Chambors et al. ....................... 360/77 |
| 4,646,175 | 2/1987 | Sokolik et al. ........................... 360/78 |
| 4,647,994 | 3/1987 | Irwin et al. .............................. 360/85 |
| 4,651,239 | 3/1987 | Omori et al. ............................ 360/77 |
| 4,863,114 | 9/1989 | Moeller et al. .......................... 242/188 |
| 4,975,791 | 12/1990 | Eggebeen ............................. 360/77.01 |
| 4,984,111 | 1/1991 | Rudi ..................................... 360/96.5 |
| 5,123,006 | 6/1992 | Lemelson ............................... 369/100 |
| 5,268,802 | 12/1993 | Bar ........................................ 360/77.13 |
| 5,276,566 | 1/1994 | Clifford, Jr. ............................. 360/64 |
| 5,293,281 | 3/1994 | Behr et al. .............................. 360/77.07 |
| 5,321,557 | 6/1994 | Shimotashiro et al. ................ 360/37.1 |
| 5,321,570 | 6/1994 | Behr et al. ............................... 360/121 |
| 5,333,085 | 7/1994 | Prentice et al. ......................... 360/104 |
| 5,359,428 | 10/1994 | Kubota et al. .......................... 358/335 |
| 5,390,059 | 2/1995 | Tokuyama et al. ..................... 360/104 |
| 5,431,969 | 7/1995 | Mallary .................................. 427/599 |
| 5,452,166 | 9/1995 | Aylwin et al. ........................... 360/126 |
| 5,523,904 | 6/1996 | Saliba .................................... 360/77.12 |
| 5,585,773 | 12/1996 | Murata et al. ........................... 336/90 |

FOREIGN PATENT DOCUMENTS

WO 96/15531   5/1996   WIPO .

OTHER PUBLICATIONS http://www.quantum.com/products/whitepapers/dlttips.html, Technical Information Papers (TIPS), "DLT(tm) Tape Drives Meet Critical Needs for Data Backup", 7 pages.
http://www.quantum.com/products/whitepapers/dlt/DLT7000.HTM, "Meeting the Storage Challenges of the 1990s; The DLT™ 7000 Tape Drive: A New Level of Performance", 7 pages.

*Primary Examiner*—Muhammad Edun
*Attorney, Agent, or Firm*—Woodcock Washburn Kurtz Mackiewicz & Norris LLP

[57] ABSTRACT

A method and a system for recording and reading magnetic information on a linear tape are disclosed. A write head is disclosed that is wider than the read head. Tracks of discrete, elongate bits of information, which are oriented perpendicular to the long axis of the tape, are recorded by the write head. The read head avoids crosstalk without employing azimuth recording techniques by re-positioning the read head over the center of the narrowed track prior to beginning the reading process. The combination of the narrow read head and re-positioning of the read head enables track trimming, which provides high lateral track density. The drive disclosed is capable of reading and recording on existing QIC tapes, as well as higher density cartridges.

13 Claims, 6 Drawing Sheets

TRACK TRIMMING AND ORTHOGONAL RECORDING FOR CARTRIDGE TAPE

FIELD OF THE INVENTION

This invention relates to storing and reading digital information, and more particularly, to linear tapes and drives for storing and reading magnetic information.

BACKGROUND

Small tape drives for writing and reading data stored on tape in mini-cartridges are commonly used in computer systems. The ¼-inch tape size is one popular size. U.S. Pat. No. 4,863,114-Moeller, et al. shows a mini-cartridge in which magnetic tape stores computer data. U.S. Pat. No. 3,526,371-Blackie et al; U.S. Pat. No. 3,924,823-Cohen, et al; U.S. Pat. No. 4,647,994-Irwin, et al; and U.S. Pat. No. 4,984,111-Rudi are examples of drives utilizing this type of data cartridge.

Quarter-Inch Cartridge Drive Standards Inc, 311 East Carillo Street, Santa Barbara, Calif. 93101 publishes development standards adopted by several manufacturers for tape drives. These standards describe an 80/120 megabyte, 28-track, 14,700 bpi (579 bmm) MFM-encoded flexible disk controller compatible recording format using a ¼-inch mini-data cartridge. Published standards included "FLEXIBLE-DISK-CONTROLLER-COMPATIBLE RECORDING FORMAT FOR INFORMATION INTERCHANGE", QIC-80 Revision D, Dec. 6, 1989, "COMMON COMMAND SET INTERFACE SPECIFICATION FOR FLEXIBLE DISK CONTROLLER BASED MINI-CARTRIDGE TAPE DRIVES", QIC-117, Revision B, Dec. 6, 1989; and "SERIAL RECORDED MAGNETIC TAPE MINICARTRIDGE FOR INFORMATION INTERCHANGE," QIC-3020. These published standards are incorporated herein by reference. Companies which make tape drives for reading and writing tapes generally to these standards include: Mountain Network Solution, 240 East Hacienda Avenue, Campbell, Calif. 95008; Wangtek Corp., 41 Morehand Road, Seme Valley, Calif. 92605; Archive Corp., 1650 Sanflower Avenue, Costamesa, Calif. 92626; CMS Enhancements, 1372 Valencia Avenue, Fustin, Calif. 92680; and Iomega Corp., San Diego, Calif., which is the assignee of the present invention.

Similar tape drives are available which write tapes in a format which is not compatible with the QIC standards. One example of such a drive is that manufactured by Irwin Magnetics, Inc. U.S. Pat. Nos. 4,646,175; 4,586,094 and 4,498,129-Chambors, et al. describe the tape drive and format of tapes written on these drives.

Regardless of whether the drives comply with QIC standards, conventional tape recording and reproducing systems for use as computer data storage devices are required to provide high data transfer rates and high linear information density. To satisfy these requirements, conventional tape systems typically employ methods of recording known as linear recording, in which the tracks of lie parallel to each other and to the edge of the tape, or helical scan recording, in which the tracks of data lie parallel to each other but diagonal to the edge of the tape. Tracks of data typically comprise discrete, magnetized bits of information that are produced on the magnetic tape in an elongate shape. A series of the bits are recorded along the length of the tape to produce the track.

Tape track density is limited by lateral tape motion, which is the random and unavoidable tendency for a tape randomly to drift in a direction normal to the longitudinal direction of tape motion. During the writing process, lateral tape motion causes track position to deviate from the parallel to the edge of the tape. During the reading process, lateral tape motion causes mis-registration of the read head over the track being read, which may result in read data error. Although the mis-registration typically manifests only during the reading process, the lateral tape motion occurring both during the reading and writing processes causes the read head position error.

Moreover, even without lateral tape motion, the physical space required for each track is a limiting factor on overall tape density. One limiting factor is head size. Unfortunately, diminishing the size of the heads, which has been the industry trend, typically results in protracted development cycles and diminished competitive advantage at the time of market introduction. Tape track densities are also limited by crosstalk, which occurs when reading is interfered with by data of adjacent tracks. Crosstalk is exacerbated by error in head gap alignments and by lateral tape motion. Techniques to minimize the crosstalk-related problems include leaving guard bands between tracks, or using wider write head gaps or wider tracks. These techniques, however, limit track densities.

Although the linear recording method offers higher data transfer rates, it is desirable to obtain higher data densities while retaining the advantages of this method. Various methods of increasing tape track densities have therefore been pursued. A well-known method of recording known as azimuth recording has been used in helical scan recording systems, and has recently been applied in linear tape systems to increase the track density of these systems. Azimuth recording results in a recorded track pattern in which the magnetization directions of adjacent data tracks lie at different azimuth angles to each other. This method greatly reduces crosstalk from adjacent tracks, allowing tracks to be placed closer together. The need for guard band spaces between tracks, wide write heads or narrow read heads is thus reduced or eliminated. U.S. Pat. No. 5,293,281, entitled "Method of Reading and Writing Data Transitions on Side-By-Side Tracks on Magnetic Media," (Behr), which is incorporated herein by reference in its entirety, employs azimuth recording.

Another technique is to record servo information onto the tape at various locations along its length or on separate levels. U.S. Pat. No. 5,523,904, entitled "Linear Tape Write Servo Using Embedded Azimuth Servo Blocks," (Saliba), which is incorporated herein by reference in its entirety, and the Behr U.S. Pat. No. 5,293,281 provide such a servo system. Unfortunately, such servo systems utilize tape that may otherwise be available for storing data, limits track density, and add cost and complexity to the drive. Additionally, servo written cartridges require development of expensive servo writing equipment used for the manufacture of said cartridges (servo writers). The combination of added drive and cartridges costs as well as extended development cycles only work against the two prime requirements (affordability and timeliness) for a successfull product introduction. More specifically, the additional drive functions needed to accommodate recorded track following schemes include, but are not limited to: linear head actuator, control electronics, demodulator circuit, additional microprocessor bandwidth, larger program memory (ROM and RAM), and substantially more complex firmware. There is, therefore, a need for techniques to increase performance and capacity without using closed loop servo schemes.

The Behr patent further describes a technique for overlapping a portion of a first track by a subsequent track to produce a narrowed first track. However, the Behr patent describes data disposed only in an azimuthal orientation. Such azimuth recording has the advantage of diminishing crosstalk because the head reading a certain track will be angularly offset from the adjacent track. However, in drives described herein, the use of a single inexpensive, readily available monolithic read-write head precludes the use of the Behr technique that requires multiple alternate azimuth heads or a single head with complex titling mechanics and control electronics. Moreover, aligning heads during assembly to the precise azimuth angles typically adds cost to the azimuth recording system. Furthermore, such systems lack compatibility with other tape systems.

Therefore it is desirable to provide techniques for increasing track density of a linear tape while diminishing the risk of data error due to crosstalk to increase compatibility, and to reduce cost and complexity of the drive. The foregoing and other objects, features and advantages of the invention will become evident hereinafter.

SUMMARY OF THE INVENTION

In accordance with the present invention, a drive and method for recording and reading magnetic information on a linear tape that employ track trimming are provided. The drive includes one mono lithic (thin film) head with two gaps: a read gap and a write gap. The write gap is relatively wide and the read gap is relatively narrow. For convenience, the terms "gap" and "heads" are used interchangeably where appropriate in this application in accordance with the broad scope of the invention. The write head is initially positioned by a servo burst embedded in the tape. After a reference track is written, each subsequent track overlaps an earlier track to produce a narrowed track.

It is important to note that the present invention does not employ azimuth recording. Rather, the information written on each track is substantially perpendicular to the direction of travel of the heads, and perpendicular to the edge of the tape. This orientation would ordinarily be infeasible without using guard bands or other measures to prevent crosstalk, because lateral tape motion would cause the heads to drift, and the read head may therefore drift over a portion of an adjacent track.

According to the present invention, two techniques are employed to solve the drift and crosstalk problems. First, because the trimmed track is wider than the read head, the read head has a tolerance in which to drift before encountering an adjacent track.

Second, the read head is re-positioned to a location approximately over the center of the narrowed track prior to the reading process, according to instructions from the firmware. Without such re-positioning, the read head would not be at the center of the narrowed track because the overlapping process erases a portion of the underlying track. Specifically, during the reading process, the read head is positioned by the firmware in the same way in which the write head is positioned, but the firmware offsets the read head by a predetermined distance to locate the read head over the calculated center of the narrowed track.

Employing the read head in the manner described herein provides several advantages. First, orthogonal orientation simplifies assembly of the drive, thereby reducing costs. Further, the present invention provides a higher track density for a given tape, thereby enhancing drive performance and reducing cost. Crosstalk is diminished without the use of azimuth recording, which either reduces the number of heads or eliminates a mechanism for positioning the same head to alternate between azimuth angles. Moreover, conventional heads, as distinguished from custom-designed heads for a particular application, may be employed to provide the benefits described herein, thereby further reducing cost.

Furthermore, the present invention may employ standard QIC head technology, as well as higher density cartridge technology. Thus, the same head that achieves increased track densities by use of this invention can be positioned by firmware to be write and read compatible with other QIC standard cartridges at no additional investment in development costs. The advantage of enabling users to benefit from improved capacity and still re-use their old cartridges is a substantial advantage as compared to using a narrower write head and not have the ability to re-record (write) the old cartridges. Conventional practice in the industry allows for backward read compatibility only. Also, the present invention better utilizes the tape by eliminating the need to embed servo information along the length of the tape. Eliminating such recorded track following technique eliminates the corresponding drawbacks of closed loop servo systems described above.

The foregoing and other objects, features, and advantages will become evident hereafter.

SHORT DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DESCRIPTION OF THE PREFERRED EMBODIMENT

The present invention encompasses a system and a method of reading and recording magnetic information on a linear tape. The present invention is described with reference to a QIC standard, although this description is for illustrative purposes only, and the present invention is not limited thereto. Rather, the system and method, as described in the appended claims, may be employed with a linear tape and corresponding drive of any size, arrangement, geometry, composition, and the like.

Figure 2:
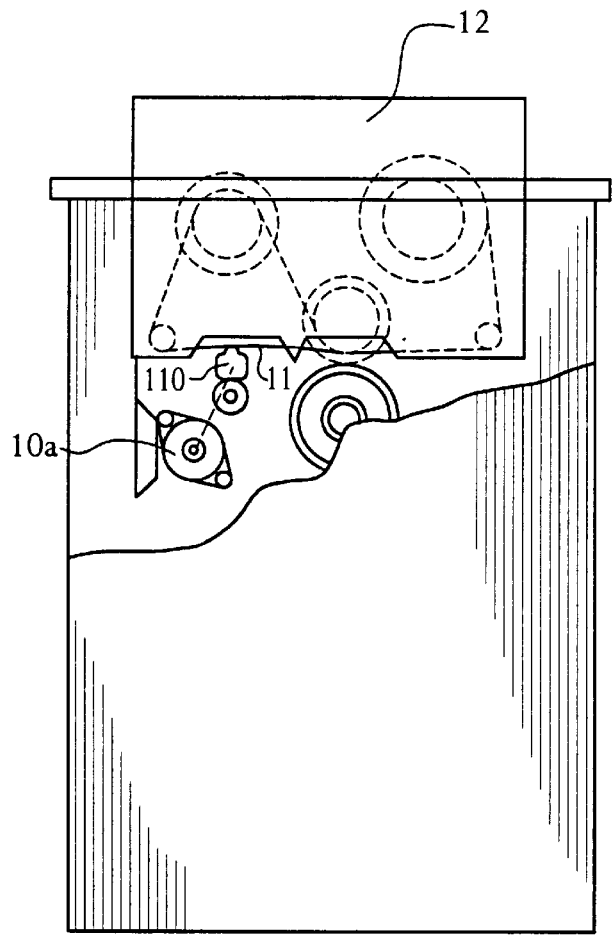
FIG. 2 shows a tape drive of the type in which the present invention is incorporated.

Referring to FIG. 2, a tape drive 13 is provided that has a magnetic head 10 that is moved across a magnetic tape 11 in steps by stepping motor 10a. Tape 11 moves between the reels in a cartridge 12. As the head moves across the tape, it reads data on the longitudinal tracks of magnetic tape 11.

Figure 3:
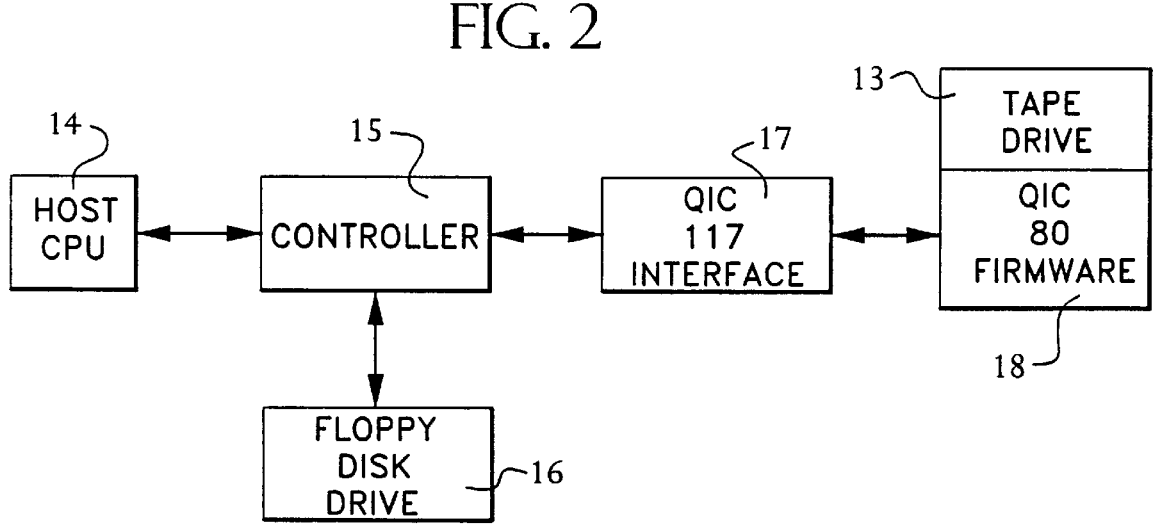
FIG. 3 is a block diagram showing the tape drive of the present invention configured in a computer system.

FIG. 3 shows tape drive 13 in a typical configuration of a personal computer system. The system includes a host computer 14 and a controller 15. Controller 15 is typically capable of operating peripherals, such as a floppy disk drive 16. The controller 15 is connected to tape drive 13 through an interface 17. The interface 17 may be specified by the aforementioned QIC117 standards, or may be of another type, as will be understood by those familiar with such interfaces. Tape drive 13 has firmware 18 which performs the operations required to meet the aforementioned QIC80, QIC117, or other standards.

Figure 4:
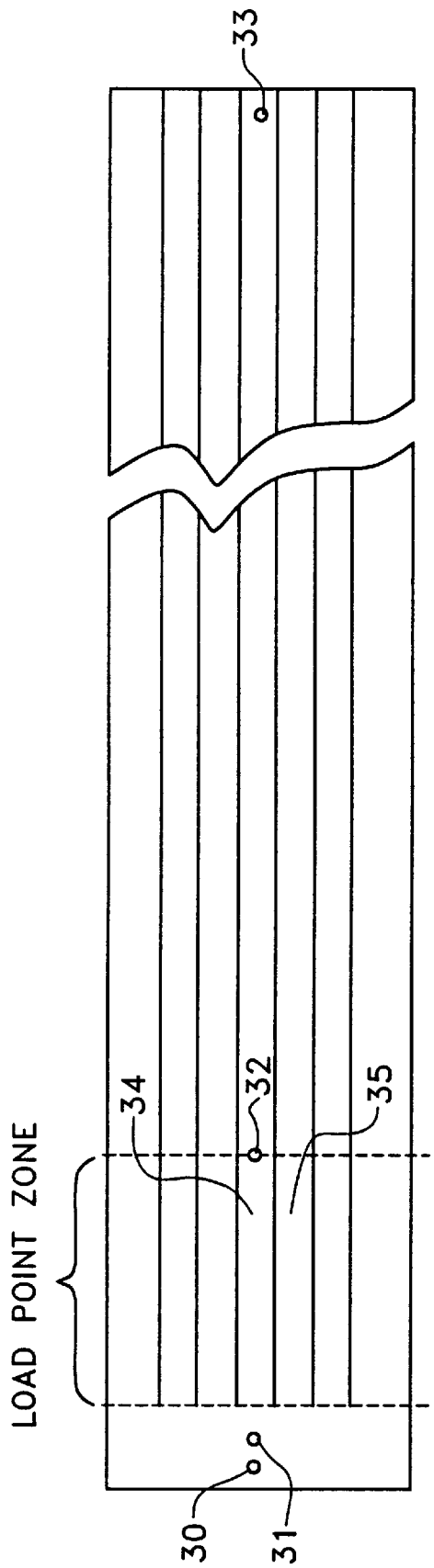
FIG. 4 depicts the track format of a standard linear tape.
Figures 5, 7:
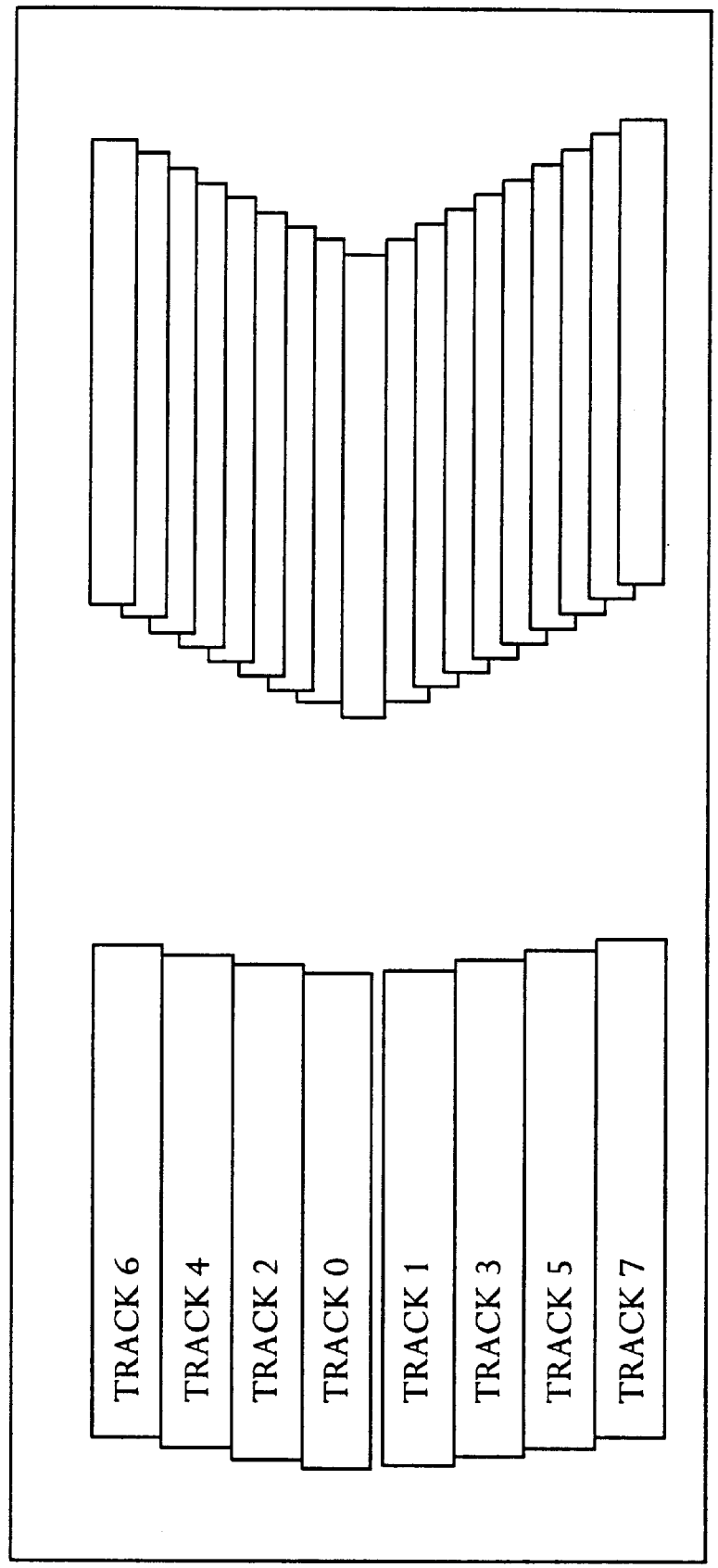
FIG. 5 illustrates a conventional numbering method of tracks on a linear tape.
FIG. 7 illustrates tracks that overlap according to the present invention.

The present invention will be illustrated with reference to FIG. 4, which depicts the layout of a QIC-formatted tape that may employ the present invention. Two physical holes 30 and 31 in the tape mark the beginning of tape. Another hole 32 marks the load point. Track 0 has a forward reference burst at 34 in the load zone. Track 3 has a reverse reference burst at 35 in the load zone. These reference bursts are described in "QIC DEVELOPMENT STANDARD FLEXIBLE DISK FOR INFORMATION INTERCHANGE", QIC-80 Dec. 6, 1989. In the QIC format, all of the even tracks are written above track 0 and are referenced to track 0 as illustrated in FIG. 5. All of the odd tracks are written below track 0, and all odd tracks are referenced to track 3. The firmware 18 includes a routine to find the reference bursts on track 0 and centers the heads 40,42 on track 0 during the recording process. Preferred techniques for employing reference bursts are described in U.S. patent application Ser. No. 08/635,717, filed Apr. 22, 1996 (Attorney Docket No. IOTA-0067), which is assigned to the assignee of the present invention and is incorporated herein by reference in its entirety.

Figure 6:
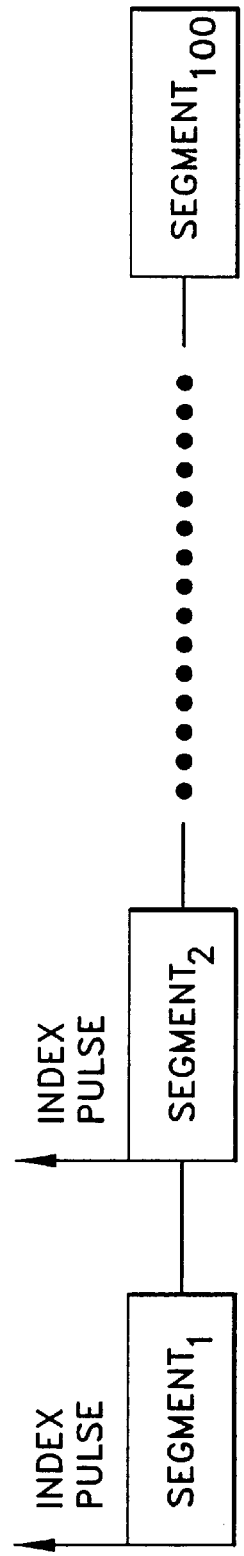
FIG. 6 shows the layout of the data segments in a conventional tape format.

FIG. 6 depicts the layout of the data segments in a QIC format. In the QIC format, there are 100 data segments each including 32 sectors and each sector has 1024 bytes. Between the segments are 20 millisecond gaps, which are time dependent on tape speed. An index pulse is generated at the beginning of each data segment for use by the host computer in reading data. The index pulse is generated by reading the GAP DETECT signal, which is the envelope of the DATA signal. In a normal QIC drive the index pulse is generated each time the GAP DETECT signal makes a transition from no data to data. U.S. Pat. Re. No. 35,205, entitled "Method and Apparatus for Determining the Format of a Magnetic Tape and for Presetting a Magnetic Head to a Reference Track Thereof," (Bar), which is incorporated herein by reference in its entirety and which is assigned to the assignee of the present invention, describes such techniques relating to tape drives in further detail.

Figure 1:
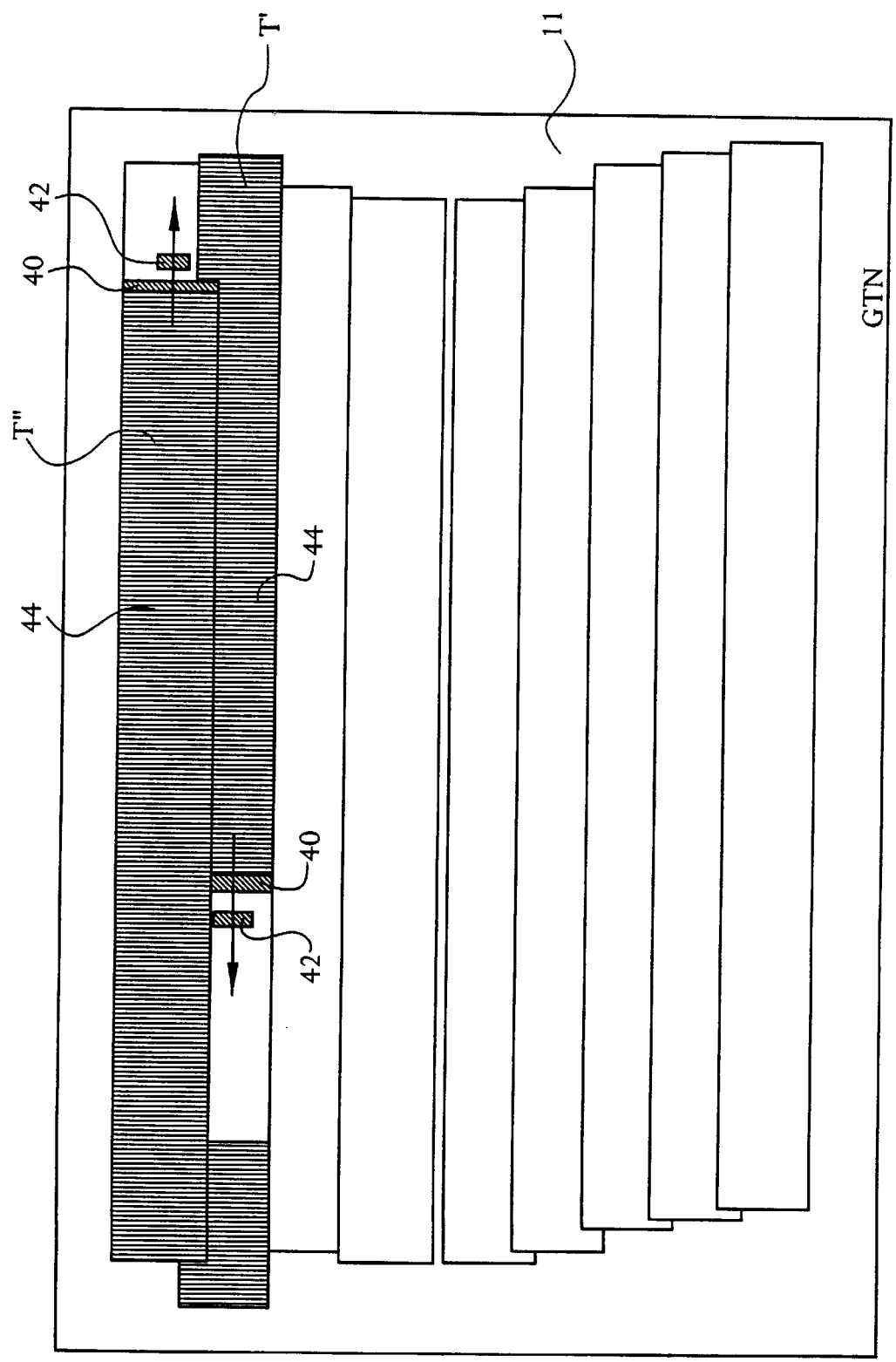
FIG. 1 is an illustration of the tracks and heads according to the present invention.

According to an aspect of the present invention, a technique for overlapping or trimming tracks on a linear tape 11 is provided. Referring to FIG. 1, a write head 40 is shown recording elongate bits of information 44 onto tracks T' and T". FIG. 1 illustrates track trimming by showing upper track T", which is recorded subsequent to recording the lower track T', overlapping the lower track T'. Preferably, the subsequent track T" overlaps the earlier track T' by approximately seventeen percent of the width of write head 40, as will be described more fully below. FIG. 7 depicts plural tracks arranged according to a preferred arrangement. Although the figures may show a given number of tracks for illustration purposes, the actual number of tracks will be determined by the particular use, as will be understood by those familiar with such drives and tracks.

The data 44 is oriented orthogonal to the direction of head travel, which is shown as arrows in FIG. 1, and orthogonal to the edge of the tape. Although such orientation may be expected to increase the likelihood of crosstalk between adjacent tracks, the relative sizes of the heads diminishes the likelihood of crosstalk. Specifically, write head 40 is wider than read head 42. As shown particularly in the narrowed track T' of FIG. 1, read head 42 is within the information disposed within the track T'. Preferably, the write head is the thin film type, and the read head is the magneto-resistive type, although the present invention encompasses any type of read and write heads that possess the relative size difference described herein. For illustrative purposes, the write head may be 0.006" wide and the read head may be 0.002" wide.

Figure 8A:
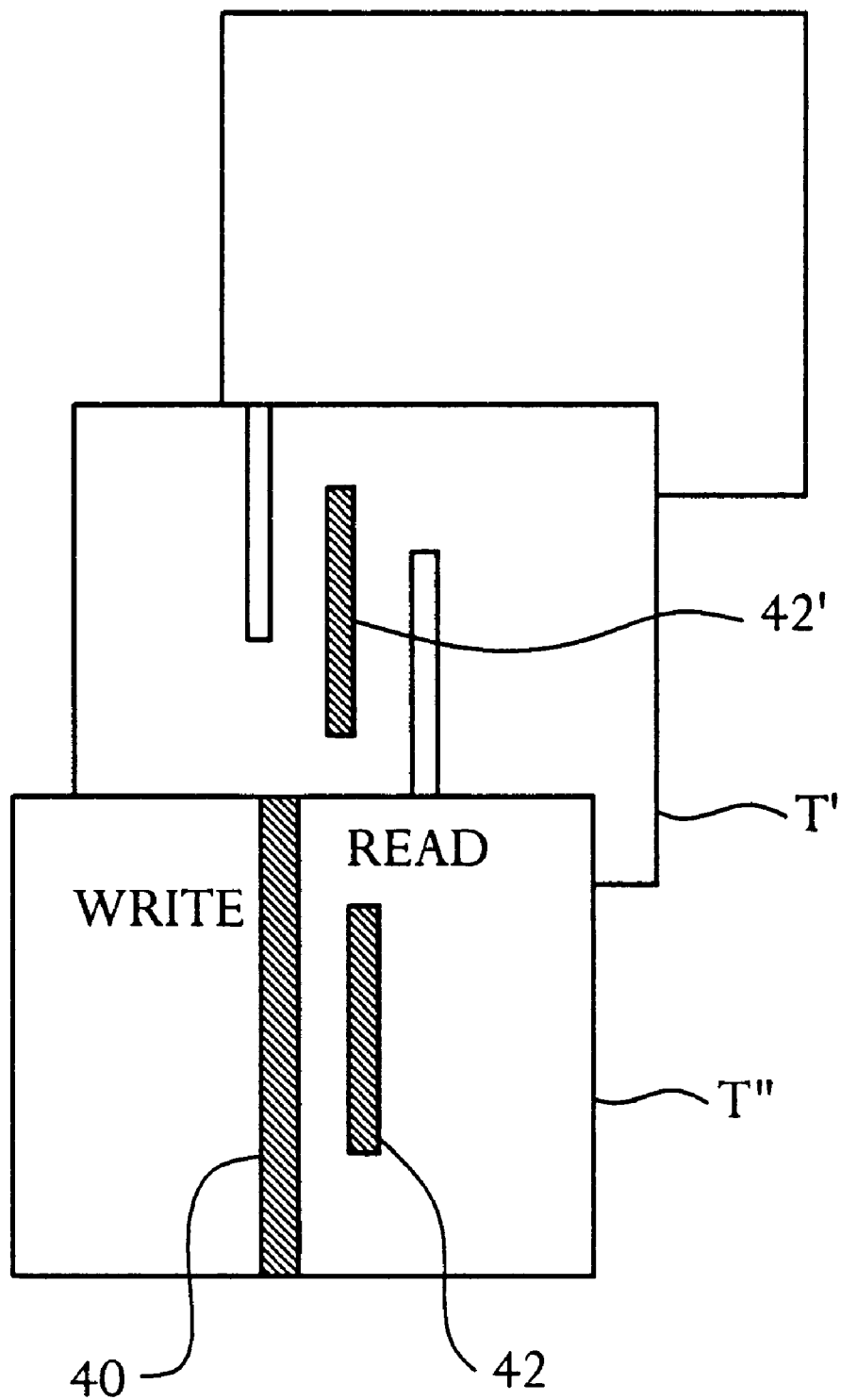
FIG. 8A and 8B depict the read head re-positioned over the center of the narrowed track according to the present invention.
Figure 8B:
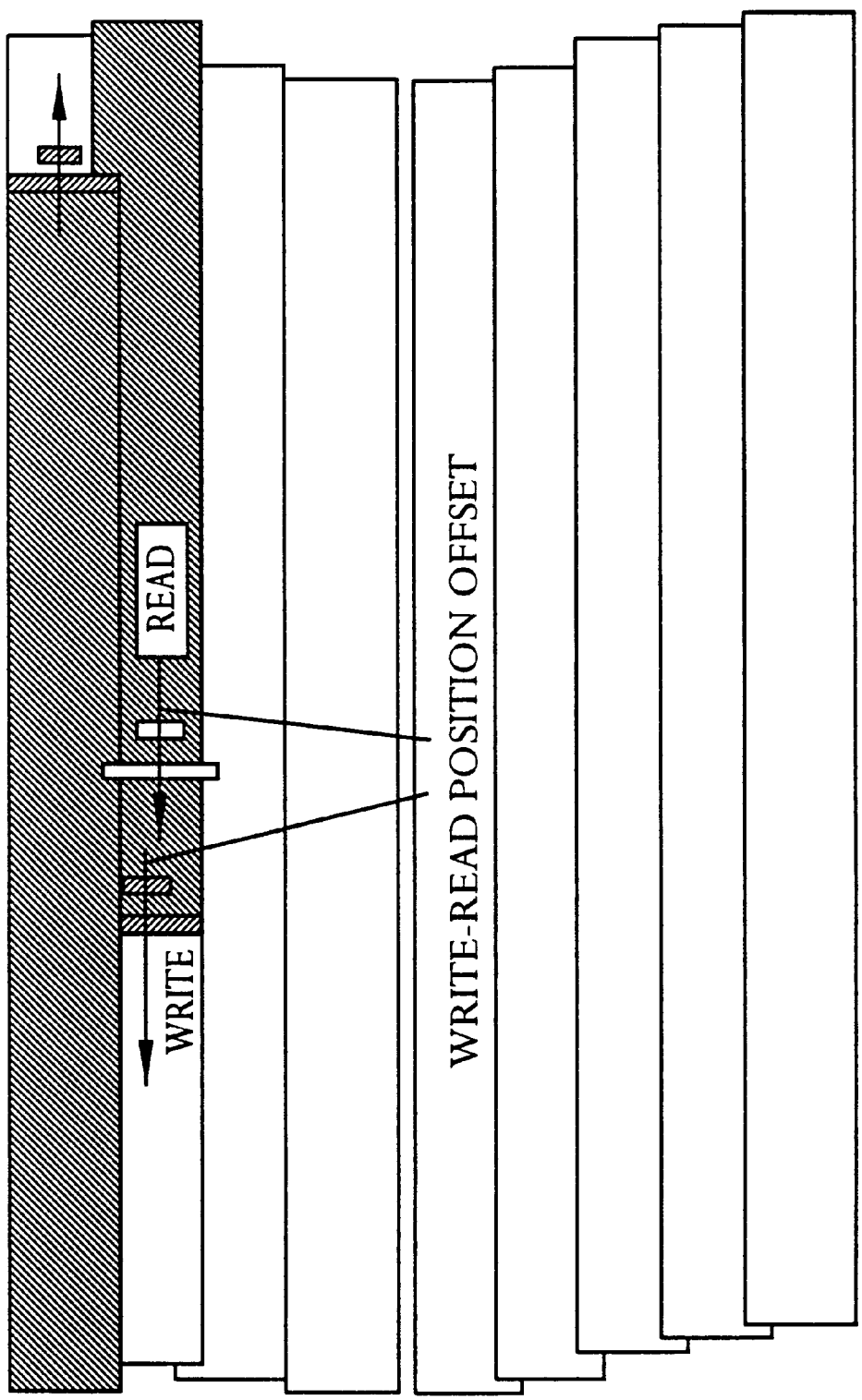

According to another aspect of the present invention, the firmware 18 is capable of re-positioning the read head 42 during the reading process. Referring to FIG. 8A and 8B, a portion of track T" is shown with the write head 40 and the read head 42 in the position in which the recording process occurs. In track T', read head 42 is shown offset a predetermined distance to re-position read head 42 approximately at the center of narrowed track T'. Firmware 18 controls the predetermined offsetting process, which is described more fully below.

The method according to the present invention will now be described. To begin the writing process, the tape write head 40 is positioned on a reference track 0, according to the firmware, based on the servo burst 34 at the beginning of tape 11. After write head 40 is positioned over the data portions of tape 11, write head 40 records data bits 44 on tape 11 upon read head 42 sensing an index pulse. Because of the orientation of write head 40, the magnetic information 44 is oriented orthogonal to the longitudinal direction of tape 11. The writing process proceeds longitudinally down tape 11, pausing only while read head 42 reads header information. Alternatively, the writing process and reading processes may be alternated within, for example, each segment.

Preferably, the writing process continues on a given track from the beginning to the end of the tape. Upon reaching the end of tape 11, the writing process reverses direction at a predetermined offset position that is controlled by firmware 18. Preferably, the subsequent track is offset to a position that overlaps the prior track by approximately seventeen percent of the track width. The resulting track, therefore, has a width that is approximately eighty-three percent of the width of Write head 40. In drives 13 in which the write head is 0.006" wide, the overlap or offset amount is 0.001", which results in a narrowed track width of 0.005".

To begin the reading process, read head 42 is positioned according to servo burst information 34. According to an aspect of the present invention, the read head 42 is re-positioned prior to beginning the reading process such that the center of read head 42 is aligned with the longitudinal center of the narrowed track 11, according to instructions in firmware 18. The mechanism for re-positioning read head 42 comprises any conventional technique, as will be understood by those familiar with such drives and techniques.

Because, during the recording process, read head 42 preferably is centered with respect to write head 40, read head 42 must be re-positioned by half the amount of the overlap. In situations in which the overlap is approximately seventeen percent of the write head width, the read head must be re-positioned by approximately 8.5 percent of the write head width to locate the write head over the longitudinal centerline of the narrowed track. Specifically, if the write head produces a track of 0.005" (five one-thousandths) before trimming, and the overlap is approximately seventeen percent, firmware 18 must direct the head 10 to re-position the read head 42 by 0.0005" (five ten-thousandths) toward the center of the narrowed track. Such a re-positioned head is shown in FIG. 8A, with the original positions of head 42 during the recording process shown in relief. Two heads are shown in relief in FIG. 8 to correspond the read head position during each direction of the recording process.

During the reading process, the tape may drift within a tolerance created by the difference between the track width and the width of read head 42. Using the dimension provided for illustration herein, the tolerance is 0.0015" (fifteen ten-thousandths) on each side of read head 42. Such tolerance enables drive 13 to operate without intermittently referring to servo information disposed within tape 11 while providing high track density.

It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A method of recording and reading digital information on a linear tape, comprising the steps of:

providing a read head and a write head that is wider than the read head;

recording a first track of magnetic information on the tape that includes plural elongate bits, the first track plural bits having an orientation substantially perpendicular to a longitudinal axis of the tape;

recording a second track of magnetic information on the tape that includes plural elongate bits, the second track plural bits having an orientation substantially perpendicular to the longitudinal axis of the tape, is substantially parallel to the first track, and overlaps a portion of the first track to produce a narrowed first track; and reading the information with the read head.

2. The method of claim 1 further comprising the step of:

recording multiple tracks in succession on the tape, each one of the multiple tracks overlapping a portion of an adjacent track.

3. The method of claim 1 further comprising the step of:

moving the read head to a position approximately central to a longitudinal centerline of the narrowed first track prior to the reading step.

4. The method of claim 1 wherein the step of recording a second track of magnetic information includes erasing the portion of the first track that is overlapped by the second track such that the first track directly abuts the second track.

5. The method of claim 1 further comprising the step of:

recording servo information for at least one track proximate an end of the tape.

6. A method of recording and reading digital information on a linear tape, comprising the steps of:

providing a read head and a write head that is wider than the read head;

recording a first track of magnetic information consisting of plural elongate bits, each one of the first track plural bits having an orientation substantially perpendicular to a longitudinal axis on the tape;

recording a second track of magnetic information consisting of plural elongate bits, each one of the second track plural bits having an orientation substantially perpendicular to a longitudinal axis on the tape, the second track being substantially parallel to the first track and overlapping a portion of the first track to produce a narrowed first track;

re-positioning the read head to a position approximately central to a longitudinal centerline of the narrowed first track; and reading the information with the read head subsequent to the re-positioning step.

7. The method of claim 6 further comprising the step of:

recording multiple tracks in succession on the tape, each one of the multiple tracks overlapping a portion of an adjacent track.

8. The method of claim 6 wherein the step of recording a first track comprises recording a first track of magnetic information that includes plural elongate bits having an orientation substantially perpendicular to a longitudinal axis of the tape, and the step of recording a second track comprises recording a second track of magnetic information that includes plural elongate bits having an orientation substantially perpendicular to a longitudinal axis of the tape.

9. The method of claim 6 wherein the step of recording a second track of magnetic information includes erasing the portion of the first track that is overlapped by the second track.

10. The method of claim 6 further comprising the step of:

recording servo information for at least one track proximate an end of the tape.

11. A drive for recording and reading magnetic information on a linear tape, comprising:

a write head oriented substantially perpendicular to a longitudinal axis of the tape capable of recording a first track of information on the tape and a second track of information that overlaps a portion of the first track to produce a narrowed first track;

a read head having a width that is less than a width of the write head capable of reading the information recorded by the write head, the information of each one of the first track and the second track consisting of discrete elongate bits that have an orientation substantially perpendicular to the longitudinal axis of the tape; and a motor for moving the tape relative to at least one of the write head and the read head.

12. The system of claim 11 wherein the read head is capable of being moved to a position approximately central to a longitudinal centerline of the narrowed first track.

13. The system of claim 11 further comprising a means for moving the read head to a position approximately central to a longitudinal centerline of the narrowed first track.

* * * * *